United States Patent [19]

Malone

[11] 4,349,204
[45] Sep. 14, 1982

[54] NON-EXTRUDING INFLATABLE PACKER ASSEMBLY

[75] Inventor: Billy C. Malone, Pearland, Tex.

[73] Assignee: Lynes, Inc., Houston, Tex.

[21] Appl. No.: 258,706

[22] Filed: Apr. 29, 1981

[51] Int. Cl.$^3$ .................. E16J 15/46; E21B 33/127
[52] U.S. Cl. .................................. 277/34; 277/30; 166/120; 166/187
[58] Field of Search ............... 277/30, 31, 34, 34.3, 277/34.6; 166/120, 187, 196, 207, 212

[56] References Cited

U.S. PATENT DOCUMENTS

| | | | |
|---|---|---|---|
| 1,549,168 | 8/1925 | Townsend | 277/34 X R |
| 2,196,668 | 4/1940 | Ragan | 277/34 X R |
| 2,643,722 | 6/1953 | Lynes et al. | 166/187 X R |
| 3,581,816 | 6/1971 | Malone | 166/187 |
| 3,604,732 | 9/1971 | Malone | 277/34 X R |
| 3,606,924 | 9/1971 | Malone | 166/187 |

Primary Examiner—Robert S. Ward, Jr.
Attorney, Agent, or Firm—William C. Norvell, Jr.

[57] ABSTRACT

An extrusion resistant expansible element for use as a sealing element or packer in a subterranean well bore. The expansible element comprises an inner elastomeric sleeve to which fluid pressure is internally applied to produce the expansion forces. The internal sleeve is surrounded by an annular array of elongated reinforcing slats formed of a relatively rigid, yet deformable material such as metal or a plastic filled with reinforcing material such as fiber glass. The medial portion of the reinforcing slats is surrounded by an outer elastomeric sleeve which effects the primary seal with the well bore when the internal elastomeric sleeve is expanded through the application of fluid pressure. Those portions of the reinforcing slats adjacent to each end of the outer elastomeric sleeve are deformed into frictional abutting engagement with the well bore, thus providing securement against any axial displacement or extrusion of the outer elastomeric sleeve due to cold flow under the long applied pressure, or excessive fluid pressure or temperatures encountered in the well bore. In a modification, the elongated reinforcing slats are individually coated with an elastomeric material to improve the sealing of these elements against each other.

6 Claims, 8 Drawing Figures

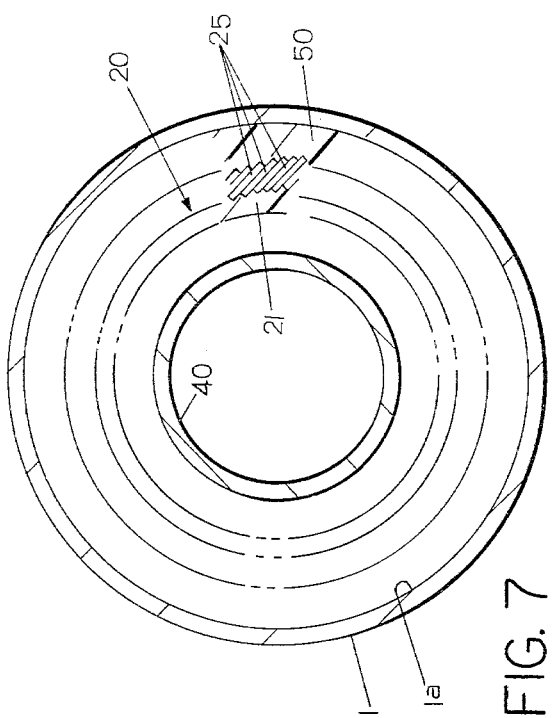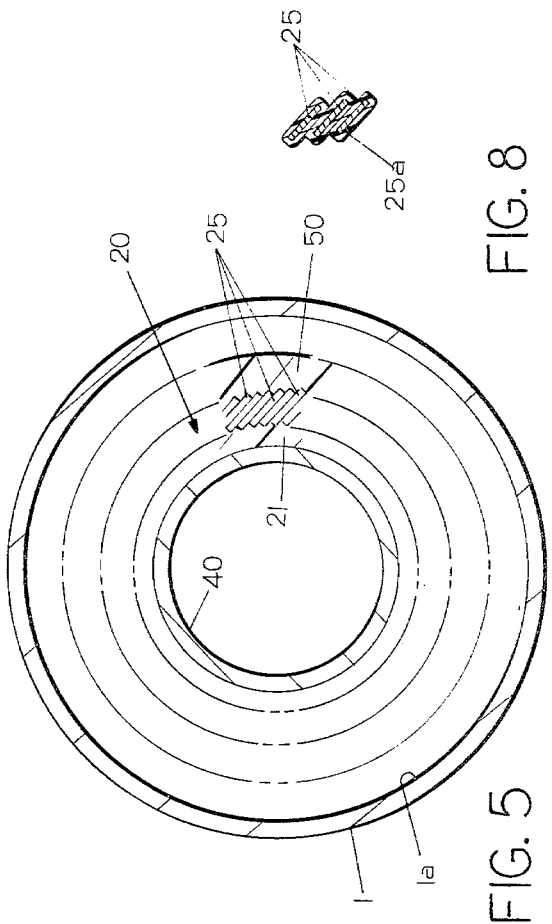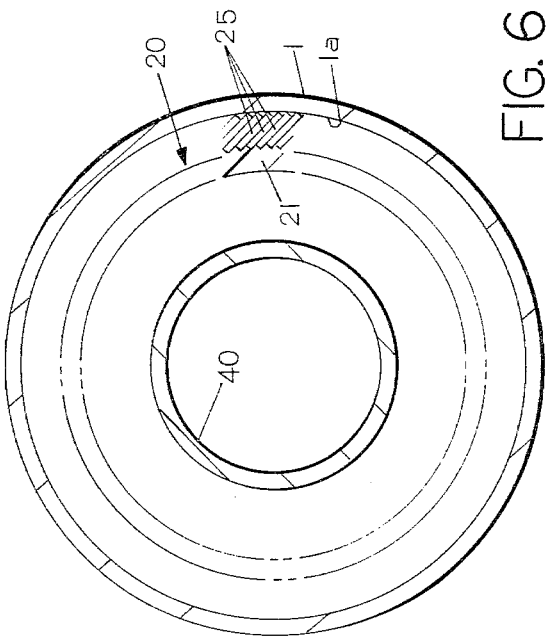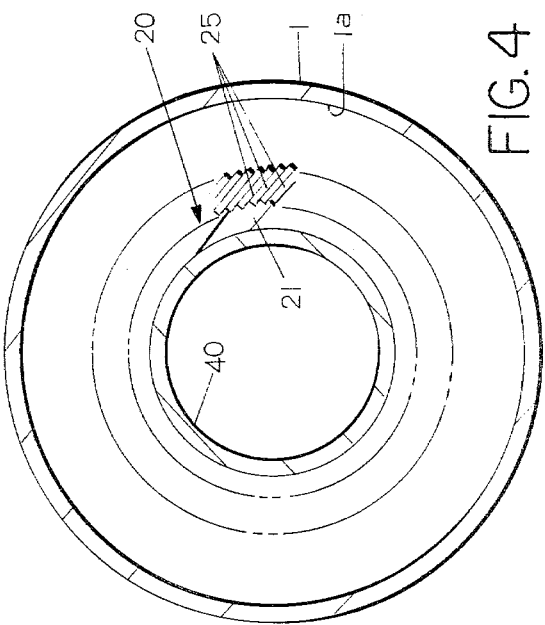

NON-EXTRUDING INFLATABLE PACKER ASSEMBLY

BACKGROUND OF THE INVENTION

1. Field of the Invention

The invention relates to an inflatable packer assembly for use in a subterranean well.

2. Description of the Prior Art

Fluid pressure expandable elements have heretofore been employed in a number of applications, such as packers and seals for subterranean well bores. One effective structure for an inflatable packer embodies an annular array of elongated slats formed of a relatively rigid, yet deformable material, such as metal. The array of slats surrounds an elastomeric sleeve which is expanded by fluid pressure applied to the inside of the sleeve to force the resulting structure radially outwardly until it engages the inner wall of a surrounding element, such as a well bore. To improve the sealability of the expanded slat constructions, it has heretofore been suggested that an outer elastomeric sleeve be provided surrounding the slat structure which is concurrently expanded by the applied fluid pressure into sealing engagement with the well bore and held in such engagement by the deformed metallic slats. Constructions of this type are shown in U.S. Pat. Nos. 3,581,816 and 3,604,732 to Malone.

It has been observed, however, that when such inflatable element is employed as a packer for a substantial period of time, the outer elastomeric sleeve tends to cold flow or extrude in an axial direction. Unusually high temperature or pressure conditions produce a similar result. Such extrusion, if continued over a substantial period, will deleteriously affect the sealing engagement of the expanded element with the well bore or actually permit slippage of the expansion element under the weight of the production string or other tools attached to the expanded element when it is employed as a packer.

SUMMARY OF THE INVENTION

This invention provides an inflatable packer for a well bore of the type utilizing an annular array of relatively rigid, but deformable slats as a reinforcing element to receive the radially outward forces produced through the application of fluid pressure to the interior of an elastomeric sleeve disposed within such annular array. An elastomeric outer sleeve is provided surrounding the annular array of slats but only covering a limited axial portion of such annular array. Thus, as the annular array of slats is deformed outwardly by the internally applied fluid pressure, the elastomeric sleeve is not only forced into sealing engagement with the well bore but, concurrently, the adjacent uncovered portions of the slat type reinforcements are forced into frictional abutting relationship with the well bore. This frictional engagement of a portion of the annular array of reinforcing slats effectively locks such slats to the well bore and prevents any axial extrusion of the outer elastomeric sleeve which is axially confined therebetween.

BRIEF DESCRIPTION OF THE DRAWINGS

FIG. 4 is an enlarged sectional view taken on the plane 4—4 of FIG. 2.

FIG. 5 is an enlarged sectional view taken on the plane 5—5 of FIG. 2.

FIG. 6 is an enlarged sectional view taken on the plane 6—6 of FIG. 3.

FIG. 7 is an enlarged sectional view taken on the plane 7—7 of FIG. 3.

FIG. 8 is a partial sectional view of a modified construction of the elongated reinforcing slats employed in the expandable packer of the invention.

DESCRIPTION OF THE PREFERRED EMBODIMENTS

Figure 2:
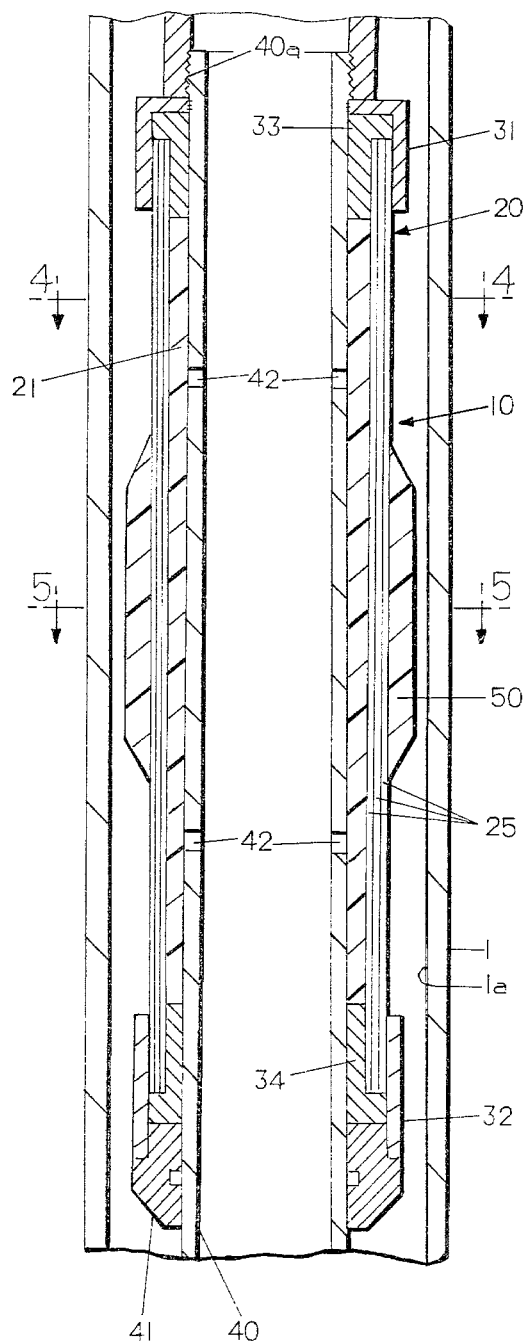
FIG. 2 is a sectional view of FIG. 1.
Figure 1:
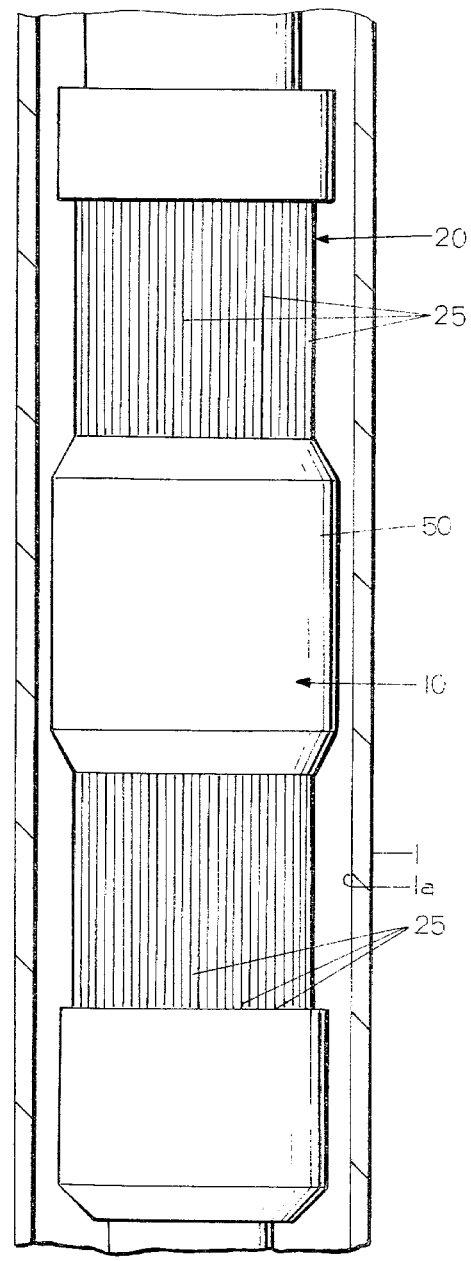
FIG. 1 is a schematic side elevational view of an expandable packer embodying this invention, with the elements of the packer shown inserted in a well casing in their non-expanded positions.

Referring to the drawings, the reference numerial 10 indicates generally an inflatable packer assembly embodying this invention. In its non-inflated condition, illustrated in FIGS. 1 and 2, the packer assembly comprises an annular inflatable wall element 20 the opposite ends of which are respectively mounted in and rigidly secured to collars 31 and 32. Within collars 31 and 32 are respectively provided bonding sleeves 33 and 34 and the space between each sleeve and surrounding collar is filled with the end portions of the inflatable assembly 20 and an appropriate cement such as epoxy resin or the seats may be directly secured to the collars 31 and 32 by welds. The bonding of the end portions of the inflatable assembly 20 between the outer collar 31 and inner sleeve 33 and outer collar 32 and inner sleeve 34 by an appropriate cement is accomplished in conventional manner as described in detail in the afore mentioned patents to Malone.

At least one of the bonding collars 31 or 32 is constructed so as to be relatively movable with respect to the other collar. In the illustrated embodiment of the invention, the collar 32 is shown as being slidably mounted upon an internal rigid sleeve 40 by a bearing ring 41 so as to be axially slidable relative to such sleeve. The sleeve 33 may then be rigidly secured to the sleeve 40 in any suitable fashion such as by welding. The sleeve 40 is provided with appropriate end connections, such as threads 40a, for effecting the connection of the sleeve in a production string or testing string of a subterranean well.

The annular inflatable element 20 further comprises a laminated structure including an inner elastomeric sleeve 21 which is readily expandable in a radial direction through the application of internal fluid pressure thereto. Surrounding the sleeve 21, are a plurality of vertically extending reinforcing slats 25. Slats 25 are of essentially identical configuration and are disposed in an annular array with the side walls of each slat being overlapped by the side walls of an adjacent slat, as best shown in FIG. 4. The slats 25 are preferably formed from a relatively rigid, yet deformable material such as metal or a fiber glass reinforced plastic. The slats will, therefore, accommodate radial outward expansion movement of the inner elastomeric sleeve 21 when fluid pressure is applied thereto. Such fluid pressure may be conveniently applied through the bore of the rigid mounting sleeve 40 and thence directed outwardly against the inner surfaces of the inner elastomeric sleeve 21 through a plurality of radial ports as at 42, or through appropriate and known valving immediate the top end of the assembly 10. Any such radial deformation of the slats 25 will inherently result in a shortening of the overall length of the inflatable assembly 20, hence, as previously mentioned, at least one of the bonding collars 31 or 32 is made relatively movable with respect to the other to accommodate such axial shrinkage movement of the inflatable assembly 20.

Figure 3:
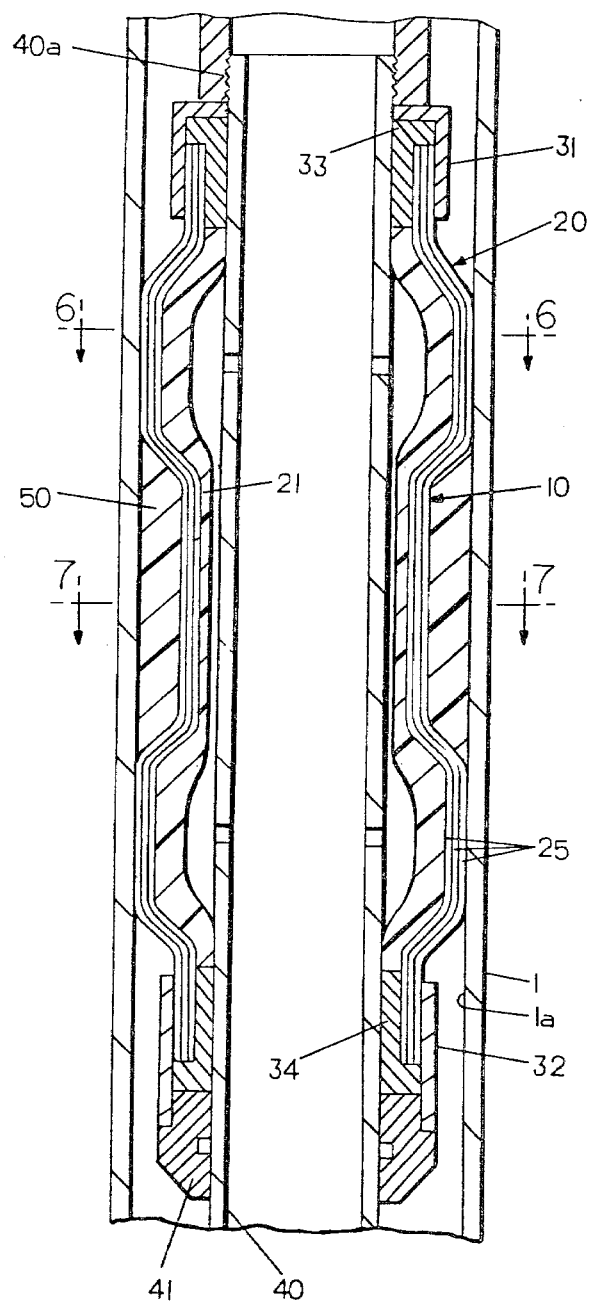
FIG. 3 is a vertical sectional view of the packer of FIG. 1 with the elements thereof shown in their expanded position produced through the application of an internal fluid pressure.

When the inflatable assembly 20 is to be employed as a packer in a subterranean well, an outer elastomeric sleeve 50 is provided in surrounding relationship to a limited axial portion of the annular array of reinforcing slats 25. Preferably, the outer elastomeric sleeve 50 surrounds the central axial portions of the expandable assembly 20. It may or may not be bonded to the outer surfaces of the slats 25. The application of internal pressure to inner sleeve 21 forces outer sleeve 50 into sealing engagement with the internal wall 1a of casing 1 (FIG. 3). Those axial portions of the slats 25 which are not surrounded by the outer elastomeric sleeve 50 are therefore further radially outwardly deformed by the internal elastomeric sleeve 21 and are forced into frictional abutting relationship with the inner wall 1a of the well bore or casing 1. This results in an actual radial deformation of the slats 25 at each axial end of the outer elastomeric sleeve 50. It will be readily apparent that the frictional bite of the uncovered portions of slats 25 with the internal surface 1a of the well bore or casing 1 is very significant, since the longitudinal edge of each slat is forced into tight engagement with the internal bore surface 1a as clearly shown in FIG. 6. Hence, the sleeve 50 is effectively confined by the outwardly deformed end portions of the assembly 20 against any axial extrusion movement produced either by cold flow or by the unexpected occurrence of unusually high temperature or pressure conditions in the well bore. It is therefore assured that the outer elastomeric sleeve 50 will be maintained in tight sealing relationship with the inner wall 1a of the well bore or casing 1 and hence can be reliably employed as a packer.

Normally the slats 25 are held by the fluid pressure in sufficiently tight lateral engagement with each other to provide a fluid sealed structure. However, if it is desired to further improve the fluid seal ability of the inflatable assembly then the modification of this invention illustrated in FIG. 8 may be employed. Referring now to FIG. 8, each of the individual reinforcing slats 25 is provided with a relatively thin elastomeric coating 25a. The provision of such coating obviously provides a more effective fluid seal between the abutting walls of the annular array of slats 25 when they are deformed outwardly into frictional engagement with the inner wall 1a of the well bore or casing 1. Hence, the seal reliability of the packer is further improved.

From the foregoing description, it is apparent that this invention provides an improved inflatable type packer or sealing element for oil well bores characterized by unusual simplicity of its components and assembly and improved reliability of the unit when expanded by internal pressure into engagement with the inner wall of a well bore or a casing.

Although the invention has been described in terms of specified embodiments which are set forth in detail, it should be understood that this is by illustration only and that the invention is not necessarily limited thereto, since alternative embodiments will become apparent to those skilled in the art in view of the disclosure. Accordingly, modifications are comtemplated which can be made without departing from the spirit of the described invention.

What is claimed and desired to be secured by Letters Patent is:

1. An extrusion resistant inflatable packing device for a subterranean well bore to provide a seal between a conduit carrying the device and an interior surface within the well bore, comprising: an axially elongated, annular inflatable body; an annular means collar rigidly secured to each end of said inflatable body; means for mounting said collar means in a well bore permitting axial movement of said collars toward each other; said inflatable body comprising an annular array of elongated slats disposed in laterally overlapping relation, said slats being formed from a relatively rigid, deformable material; an inner sleeve of elastomeric material abutting the inner wall defined by said slats; and an outer sleeve of elastomeric material surrounding only a portion of the length of the external wall of said annular array of slats, whereby the application of fluid pressure to the interior of said inner sleeve produces a radially outward displacement of said slats to force said outer elastomeric sleeve into sealing relation with the well bore and the outer surfaces of the uncovered portions of said slats into frictional relation with the well bore to thereby resist extrusion of said outer sleeve from sealing relation with said well bore.

2. The inflatable packer defined in claim 1 wherein said outer elastomeric sleeve covers only the axial medial portion of said annular array of slats, whereby the expanded portions of said slats adjacent each end of said outer elastomeric sleeve prevent axial extrusion of said outer elastomeric sleeve.

3. The inflatable packer defined in claim 1 or 2 wherein each of said slats is coated with an elastomeric material to enhance the fluid sealing properties of the expanded portions of the slats.

4. An extrusion resistant inflatable seal for a conduit disposed in a subterranean well bore to provide a seal between a conduit carrying the device and an interior surface within the well bore, comprising: an elongated, rigid sleeve connectable in said conduit; an axially elongated, annular, inflatable body surrounding said sleeve; an annular collar rigidly secured to each end of said inflatable body; means for mounting said collars on said sleeve, said mounting means permitting relative axial movement of said collars toward each other; said inflatable body comprising an annular array of elongated slats disposed in laterally overlapping relation, said slats comprising a relatively rigid, deformable material; an inner sleeve of elastomeric material abutting the inner wall defined by said array of slats and surrounding said rigid sleeve; and an outer sleeve of elastomeric material surrounding only a portion of the length of the external wall of said annular array of slats, whereby the application of fluid pressure to the inner face of said inner elastomeric sleeve produces a radially outward displacement of said slats to force said outer elastomeric sleeve into sealing relation with the well bore and the outer surfaces of the uncovered portions of said slats into frictional relation with the well bore to thereby resist extrusion of said outer sleeve from sealing relation with said well bore.

5. The inflatable seal defined in claim 4 wherein said outer elastomeric sleeve covers only the axial medial portions of said annular array of slats, whereby the expanded portions of said slats adjacent each end of said outer elastomeric sleeve prevent axial extrusion of said outer elastomeric sleeve.

6. The inflatable seal defined in claim 4 or 5 wherein each of said slats comprises metal and is coated with an elastomeric material to enchance the fluid sealing properties of the expanded portions of the metallic slats.

* * * * *